United States Patent Office 3,073,710
Patented Jan. 15, 1963

3,073,710
BITUMINOUS SEALING COMPOSITION
Franklin C. Morrow and Lloyd F. Brambie, Houston, Tex., assignors to Gulf States Asphalt Co., Inc., Houston, Tex., a corporation of Texas
No Drawing. Filed June 8, 1959, Ser. No. 818,529
16 Claims. (Cl. 106—281)

This invention relates to new and useful improvements in compositions, and particularly adhesive and sealing bituminous compositions.

An object of this invention is to provide a new and improved bituminous composition which has permanent or substantially permanent adhesive and sealing characteristics.

An important object of this invention is to provide a new and improved adhesive and sealing bituminous composition which is permanently or substantially permanently non-hardening and non-drying and therefore remains pliable and adhesive indefinitely so that a time delay between the time of applying the composition to surfaces to be joined and the contacting of the adhesive thereon does not affect the adhesive or its ability to bond and seal between such surfaces.

Another object of this invention is to provide a new and improved petroleum residual base composition which retains its adhesiveness even when applied or used in the presence of liquids such as water and alcohol so that such composition may be used for an adhesive and/or sealing such things as joints between pipes, asphalt sheets, boards on boats and many other items even though such items are completely immersed in water.

A further object of this invention is to provide a new and improved adhesive and sealing bituminous composition which has an abnormally high structural and cohesive strength immediately upon application as compared to known bituminous adhesives and it retains its strength thereafter.

Still another object is to provide a bituminous material which is non-flowing at high temperatures and can be made non-flowing at temperatures of about 350° F. or more, and which is also permanently pliable and non-cracking even by impact at low temperatures such as sub-zero temperatures.

Still another object of this invention is to provide an adhesive and sealing bituminous composition which is permanently or substantially permanently non-shrinking, whereby such composition remains in full contact with the surfaces sealed therewith even after extended periods of time.

A particular object of this invention is to provide a new and improved bituminous composition which adheres to glass, metal, ceramics, concrete, cloth and many other materials and which material has many uses, one of which is as a sealing means between joints of concrete, ceramic or metal pipe such as sewer pipe.

The composition for carrying out the invention will be hereinafter described together with other features thereof.

The composition of this invention is extremely unusual in its characteristics and behavior and it performs quite unexpectedly as compared to prior known compositions of this type. As will be more evident hereinafter, the composition of this invention has many uses because of its unusual characteristics or properties.

The composition of this invention includes a petroleum derived bitumen residual which is the residual bitumen or product resulting from the distillation of petroleum. Such bitumen residual should have a Saybolt-Furol viscosity at 210° F. of from about 50 seconds to about 250 seconds. Such residual should also have a minimum flash point (Cleveland open cup) of about 475° F. as determined by the ASTM test D92–56, and the specific gravity as determined by ASTM test D71–52 should be between about 0.95 and 1.04, with the preferred range being 0.97 to 1.00. The preferred range for the Saybolt-Furol viscosity at 210° F. is from about 100 seconds to about 200 seconds. It will be understood by those skilled in the art that the Saybolt-Furol viscosity is determined by the ASTM D88–44 procedure. It will also be understood that the designation "ASTM" as used throughout this specification identifies the American Society for Testing Materials and the tests are those specified by such group. The bitumen residual which is used in the composition of this invention should also have a low temperature susceptibility factor. As is well known, the susceptibility factor is calculated by dividing the penetration of the asphalt or other material at 77° F. by the penetration at 32° F. Such penetrations are obtained by the standard ASTM test designated D217–48. Using such basis for calculating the susceptibility factor, the bitumen residual in the composition of this invention should have a susceptibility factor not greater than 6 and preferably from about 2 to about 4. Also, the bitumen residual should be adhesive rather than unctuous and that can be determined readily by observation and contact. In other words an adhesive residual will tend to stick to the fingers when contacted by the fingers but an unctuous residual will have an oily feel and will not be adhesive or stick to the fingers.

The composition of this invention includes an additive which includes finely ground material and/or fibrous material so that the composition remains pliable or workable and also sag-resistant at temperatures at least as high as 300° F. There are a number of finely ground materials and fibrous materials which will serve as the additive or additives in the composition. By way of example, the finely ground material or materials may be bentonite, diatomaceous earth, colloidal clays, talc, slate flour and, silicates, each of which should be fine enough to pass standard mesh screens from 100 to 400 in size. Since the product of this invention has many uses and is often used in conjunction with the sealing of pipe joints where the composition is exposed to both acids and alkalies, it is desirable, and in some cases essential to provide a fibrous material such as asbestos, Wollastonite or other magnesium silicate which is chemically inert to the acid and alkali reactions. However, fibrous materials other than such acid and alkali resistant materials may be employed. For example, diatomaceous earth, ground vegetable or mineral fibers, cotton linters, rice hulls, jute, hemp, bagasse and other known organic or inorganic fibrous materials may be used.

It is important to note that the components set forth above would not have a solvent therewith, and no portion of the composition is subject to evaporation or drying.

To illustrate the invention, the following specific examples or embodiments of the composition of this invention are set forth, but it is to be understood that such examples are by way of illustration and are not to be construed as limiting the invention.

| Tests on Final Product | Example I | Example II | Example III | Example IV |
|---|---|---|---|---|
| Specific Gravity, ASTM D71-52 | 1.05 | 1.20 | 1.30 | 1.50 |
| Wt./Gal., Specific Gravity × 8.33 | 8.75 | 10.00 | 10.83 | 12.49 |
| Flash Point (C.O.C.), ASTM D92-56 | ¹475 | ¹475 | ¹475 | ¹475 |
| Soft Point, ASTM D36-26 | ¹150 | ¹300 | ¹320 | ¹350 |
| Ductility @ 77° F., ASTM D113-44 | ¹15 | ¹10 | ¹5 | ¹3 |
| Percent Finely Ground and Fibrous Material by Weight, AASHO T. 111-42 | 5 | 30 | 40 | 55 |
| Percent Bitumen by Weight, ASTM D4-52 | 95 | 70 | 60 | 45 |
| Penetration Cone, ASTM D217-48 @ 77° F., 5 sec., 200 gm. total | 170 | 115 | 55 | 40 |
| Penetration Cone, ASTM D217-48 @ 32° F., 60 sec., 300 gm. total | 210 | 160 | 140 | 115 |
| Penetration Cone, ASTM D217-48 @ 115° F., 5 sec., 150 gm. total | 250 | 140 | 160 | 40 |

¹ Minimum, ° F.

In the foregoing examples, the "ASTM" designations refer to the well known tests of the American Society for Testing Materials, as previously explained. The test for the percentage of the finely ground and/or fibrous material is an "AASHO" test and is also a well known test established by the American Association of State Highway Officials.

The percentage of the bitumen or bitumen residual in the composition may vary from about 45% by weight to about 95% by weight, the amount depending to some extent upon the particular application for the composition. The bitumen referred to in the foregoing examples is the petroleum derived bitumen residual described previously in this specification and should have the properties previously referred to herein. The percentage of the additives, namely, finely ground material and the fibrous material, may vary between about 5% by weight and 55% by weight, and generally such materials are present in a mixture with equal parts of each material. In each of the above examples, the finely ground material was bentonite, and the fibrous material was asbestos and they were present in equal amounts. Such materials are intimately mixed with the residual with standard mixing equipment. By way of further example, each of the foregoing examples may be varied by using as the additive all of one of the fibrous materials previously set forth or all of one of the finely ground materials, or a mixture of any of such materials, in the various percentages set forth in the Examples I through IV. In such instances, the other properties of the materials in each of such examples would be the same.

As previously mentioned, the composition of this invention has many uses because of its unusual properties and characteristics. The material is pliable and is not subject to cracking even by impact at extremely low temperatures such as sub-zero temperatures, while at the same time, the material will resist a tendency to flow even at temperatures as high as 350° F. Such properties are reflected in the softening point and ductility tests and data set forth above with respect to each of the examples. Additionally, the non-shrinking, the non-hardening and the non-drying properties of the material are permanent, or substantially permanent, so that such properties will remain constant over a long period of years. Additionally, the composition or material of this invention is permanently, or substantially permanent, adhesive and also it has permanent, or substantially permanent sealing characteristics. For that reason, the composition of this invention may be applied in a situation for serving to bond together surfaces or to seal same and may be left in that condition for a long period of time without danger of the material becoming brittle or cracking or losing its bond. Additionally, the composition of this invention has waterproofing, insulating and acoustical properties. Furthermore, the material of this invention retains its adhesiveness and sealing properties even when applied in the presence of liquids such as water or alcohol so that it may be applied to surfaces for bonding and sealing same even when such surfaces are immersed under water. The composition of this invention is therefore unusual and its properties are so unique that it opens an entire new area for the use of this type of composition. One of the principal uses for this invention is as a sealing and adhesive joint composition between sections of pipe made of concrete, ceramic, steel or other materials. This material readily conforms to the surfaces of the pipe joint which are to be adhered or sealed and it remains pliable so that even if there is a shifting of the sections of the pipe relative to each other the seal remains effective.

Other typical uses for this composition or material would be as a seal or bonding composition between asphalt sheets, particularly such sheets as are immersed in water or are subjected to moisture and water in use. Also, another use for this invention would be for sealing between boards or other members which may be used in a boat and which may be subjected to moisture or water in use. Therefore, it is believed evident that the composition of this invention is a highly unusual material and that it has many uses which will occur to those skilled in the art.

What is claimed is:

1. A composition having permanent sealing and adhesive properties, comprising, from about 45% to about 95% of petroleum derived bitumen residual having a Saybolt-Furol viscosity at 210° Fahrenheit of from about 50 seconds to about 250 seconds, and with essentially all of the remainder an additive selected from the group consisting of finely ground inorganic silicates, vegetable fibers, mineral fibers, rice hulls, and mixtures thereof.

2. A composition having permanent sealing and adhesive properties, comprising, from about 45% to about 95% of petroleum derived bitumen residual having a minimum flash point (C.O.C.) of 475° Fahrenheit and a Saybolt-Furol viscosity at 210° Fahrenheit of from about 50 seconds to about 250 seconds, and with the remainder consisting of substantially equal parts of bentonite and asbestos.

3. A composition having permanent sealing and adhesive properties, comprising, from about 75% to about 95% of petroleum derived bitumen residual having a minimum flash point (C.O.C.) of 475° Fahrenheit and a Saybolt-Furol viscosity at 210° Fahrenheit of from about 50 seconds to about 250 seconds, and with the remainder an additive selected from the group consisting of finely ground inorganic silicates, vegetable fibers, mineral fibers, rice hulls, and mixtures thereof.

4. A composition having permanent sealing and adhesive properties, comprising, from about 65% to about 65% of petroleum derived bitumen residual having a minimum flash point (C.O.C.) of 475° Fahrenheit and a Saybolt-Furol viscosity at 210° Fahrenheit of from about 50 seconds to about 250 seconds, and with the remainder an additive selected from the group consisting of finely ground inorganic silicates, vegetable fibers, mineral fibers, rice hulls, and mixtures thereof.

5. A composition having permanent sealing and adhesive properties, comprising, from about 55% to about 65% of petroleum derived bitumen residual having a minimum flash point (C.O.C.) of 475° Fahrenheit and a Saybolt-Furol viscosity at 210° Fahrenheit of from about 50 seconds to about 250 seconds, and with the remainder an additive selected from the group consisting of finely ground inorganic silicates, vegetable fibers, mineral fibers, rice hulls, and mixtures thereof.

6. A composition having permanent sealing and adhesive properties, comprising, from about 45% to about 55% of petroleum derived bitumen residual having a minimum flash point (C.O.C.) of 475° Fahrenheit and a Saybolt-Furol viscosity of 210° Fahrenheit of from about 50 seconds to about 250 seconds, and with the remainder an additive selected from the group consisting of finely ground inorganic silicates, vegetable fibers, mineral fibers, rice hulls, and mixtures thereof.

7. The composition set forth in claim 1, wherein said silicates are finely divided so as to pass mesh screens from about 100 to about 400 in size.

8. The composition set forth in claim 1, wherein said bitumen residual has adhesive characteristics, a specific gravity between about 0.95 and 1.04, and a susceptibility factor not greater than about 6.

9. The composition set forth in claim 3, wherein said silicates are finely divided so as to pass mesh screens from about 100 to about 400 in size.

10. The composition set forth in claim 3, wherein said bitumen residual has adhesive characteristics, a specific gravity between about 0.95 and 1.04, and a susceptibility factor not greater than about 6.

11. The composition set forth in claim 4, wherein said silicates are finely divided so as to pass mesh screens from about 100 to about 400 in size.

12. The composition set forth in claim 4, wherein said bitumen residual has adhesive characteristics, a specific gravity between about 0.95 and 1.04, and a susceptibility factor not greater than about 6.

13. The composition set forth in claim 5, wherein said silicates are finely divided so as to pass mesh screens from about 100 to about 400 in size.

14. The composition set forth in claim 5, wherein said bitumen residual has adhesive characteristics, a specific gravity between about 0.95 and 1.04, and a susceptibility factor not greater than about 6.

15. The composition set forth in claim 6, wherein said silicates are finely divided so as to pass mesh screens from about 100 to about 400 in size.

16. The composition set forth in claim 6, wherein said bitumen residual has adhesive characteristics, a specific gravity between about 0.95 and 1.04, and a susceptibility factor not greater than about 6.

References Cited in the file of this patent

UNITED STATES PATENTS

| | | |
|---|---|---|
| 2,054,285 | Foster | Sept. 15, 1936 |
| 2,363,468 | Tollstrup | Nov. 21, 1944 |
| 2,455,709 | Spelshouse | Dec. 7, 1948 |
| 2,733,159 | Scoggin | Jan. 31, 1956 |
| 2,923,638 | Hoiberg et al. | Feb. 2, 1960 |

UNITED STATES PATENT OFFICE
CERTIFICATE OF CORRECTION

Patent No. 3,073,710　　　　　　　　　　　　　January 15, 1963

Franklin C. Morrow et al.

It is hereby certified that error appears in the above numbered patent requiring correction and that the said Letters Patent should read as corrected below.

Column 4, line 53, for "65%" read -- 75% --.

Signed and sealed this 19th day of May 1964.

(SEAL)
Attest:
ERNEST W. SWIDER

Attesting Officer

EDWARD J. BRENNER
Commissioner of Patents